Jan. 12, 1926.　　　　　　　　　　　　　　　1,569,025
H. R. PENNINGTON
METHOD OF JOINING METALS BY FUSION WELDING
Filed April 18, 1922
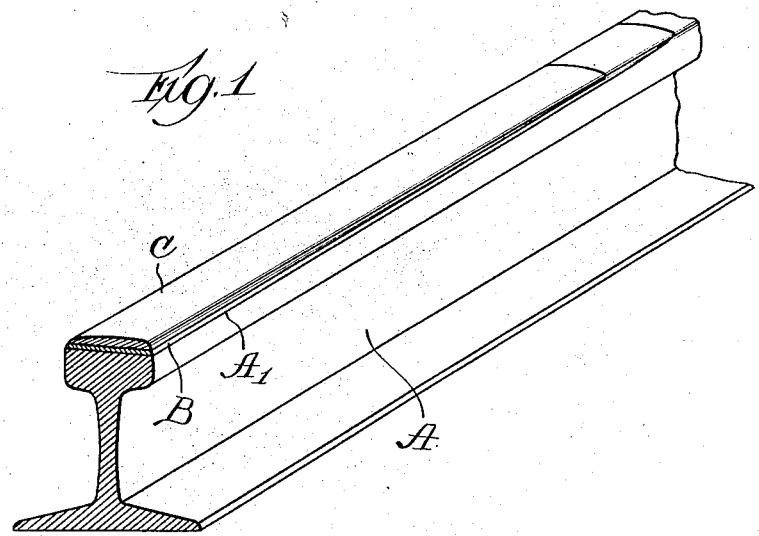
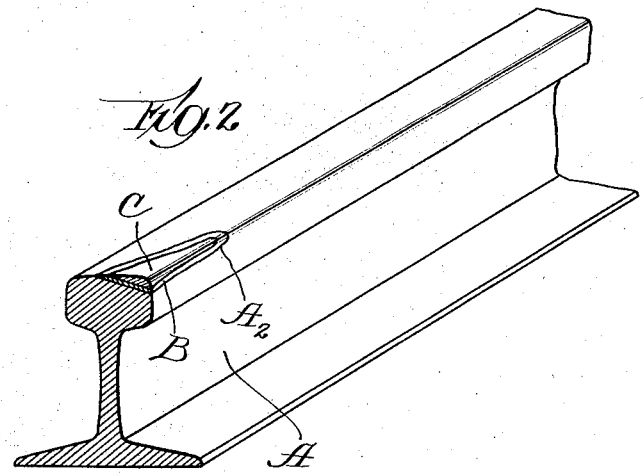
Inventor:
Harry R. Pennington
by Sheridan, Jones and Sheridan
Atty's.

Patented Jan. 12, 1926.

1,569,025

UNITED STATES PATENT OFFICE.

HARRY R. PENNINGTON, OF CHICAGO, ILLINOIS, ASSIGNOR TO C. H. HOLLUP CORPORATION, A CORPORATION OF ILLINOIS.

METHOD OF JOINING METALS BY FUSION WELDING.

Application filed April 18, 1922. Serial No. 555,377.

*To all whom it may concern:*

Be it known that I, HARRY R. PENNINGTON, a citizen of the United States, residing at Chicago, in the county of Cook and State of Illinois, have invented certain new and useful Improvements in Methods of Joining Metals by Fusion Welding, of which the following is a specification.

This invention relates to a method of joining metal by fusion welding.

The primary object of my invention is to accomplish welding of two metals requiring a dissimilar rate of cooling after the weld is effected, the result being accomplished by the interposition of a third metal unaffected by rapid or slow rates of cooling subsequent to the welding.

Other objects of the invention will be more fully described and disclosed in the following specification and illustrated in the accompanying drawing, in which—

Figure 1 is a perspective view of a rail showing a surfacing of hard metal applied thereto; and Fig. 2 is a similar perspective showing the building up of a rail where a portion has been worn out In carrying out my process, as illustrated, for example, in the application of a surface of manganese steel, which is highly resistant to wear, to carbon steel, as in the case of a rail—the carbon steel being comparatively high in carbon—I first weld to the surface of the carbon steel mild steel or iron of low or no carbon content, and thereafter weld to the mild steel or iron manganese steel, these welding operations being capable of ready accomplishment by arc and rod welding, or other methods. It is well known that in welding high carbon steel it is necessary to cool the metal slowly after the weld is effected, as a quick rate of cooling results in impairment and change in the physical structure of the metal adjacent the weld, to the detriment of such weld. It is likewise well known that in welding manganese steel, for example, it is necessary to cool or quench the metal quickly after the weld is effected, in order to prevent deteriorations at or adjacent the weld. Obviously, it is impossible or impractical to comply with both these conditions when welding manganese steel direct to the carbon steel, and hitherto it has been impossible to accomplish such a fusion of the two metals.

By the use of my process the mild steel, or iron, which is unaffected by either rapid or slow rate of cooling, is first preferably welded to the carbon steel, the latter being allowed to cool at a slow and proper rate thereafter. Subsequently I apply and weld the manganese steel to this interposed layer of mild steel or iron, and if the area of the weld is of any appreciable size I quench the jointed metals, after welding of portions thereof, in order that the carbon steel may not be maintained at a heat which would prevent quick cooling of the welded manganese steel. In this manner I am able, practically and successfully, to weld two dissimilar metals.

I do not wish, however, to be restricted to the application of my process to the specific metals mentioned in the illustration, as there are bronzes, for example, which may be used in lieu of the mild steel or iron, and in its broader aspect the process contemplates the welding of any dissimilar metals requiring different rates of cooling after welding, by the interposition and sequential welding of a third metal unaffected by either rapid or slow rates of cooling.

It is sometimes desirable in carrying out my process to treat the high carbon steel either preliminary or subsequent to the first welding, in order to overcome or prevent certain physical conditions or changes which occur as a result of the welding. This heat treatment, as I term it, may consist either in pre-heating of the rail prior to the first weld, or annealing it subsequent to the weld, either of which pre-heating operations is satisfactory to eliminate or prevent stresses or other objectionable conditions adjacent the weld.

In the drawings I have illustrated an article of manufacture produced by my process, although it is conceivable that such an article might be constructed in a different manner.

In Figure 1 I have shown in perspective a rail A, of high carbon steel, the upper portion $A_1$ of which has been worn away. A layer of iron or low carbon steel B has been welded to the upper surface of the rail, and superimposed upon the layer B, by welding, is a surface welding of manganese steel C, shaped or formed to the desired contour. By this process I am enabled to build up worn away rails, switchboards, frogs, or the like, rendering them of greater wear resistance at the points of building up and in their original form, and dispensing with the necessity of removal from position.

In Fig. 2 I have illustrated the method of building up a hollowed recess formed in the surface of the rail A, the recess being indicated by numeral $A_2$, the layer B being interposed and the upper surface being built up to proper contour by the applied body of manganese steel C.

It is within my conception that rails, switchboards, or the like, may be constructed originally in the same manner by constructing the body of carbon steel and the wearing portions of manganese steel, this permitting a very appreciable saving over similar articles constructed entirely of manganese steel, and at the same time presenting a similar resistance to wear.

I claim:—

1. A process of welding two metals, one of which must be rapidly cooled after welding and the other of which must be slowly cooled after welding, consisting in first welding to one of said metals an interposed body of metal the physical constituency of which is not impaired by either slow or rapid cooling, then cooling said welded metals at the rate required by said main metal, next welding to said interposed metal the other of said first-named metals, and then cooling the last-named metal at its proper rate.

2. A method of welding metals requiring dissimilar rates of cooling after welding, consisting in interposing and welding first to one of said metals and subsequently to the other of said metals a body of metal unaffected by either rapid or slow rates of cooling.

3. A process of welding carbon steel to manganese steel, consisting in first welding to said steel a body of metal unaffected by rapid or slow cooling, then cooling said carbon steel and thereafter welding to said interposed metal said manganese steel and quickly cooling the same after effecting the weld.

4. A process of welding carbon steel and manganese steel, consisting in pre-heating the carbon steel, thereafter welding thereto metal unaffected by rapid or slow rates of cooling, then cooling said carbon steel, and next welding to said interposed metal manganese steel and quickly cooling the same after welding.

5. A process of welding carbon steel and manganese steel, consisting in welding ferrous metal of low carbon content to said carbon steel, thereafter cooling said carbon steel, then welding to said ferrous metal manganese steel, and quickly cooling the same.

6. The process of welding carbon steel and manganese steel, consisting in subjecting the carbon steel to heat treatment, welding thereto ferrous metal of low carbon content and cooling said carbon steel, then welding to said ferrous metal said manganese steel, and quickly cooling the same after welding.

7. The process of welding carbon steel and manganese steel, consisting in interposing a ferrous metal of low carbon content and welding the same first to the carbon steel, and thereafter welding said manganese steel to said interposed metal.

In testimony whereof, I have subscribed my name.

HARRY R. PENNINGTON.